United States Patent
Thobe et al.

(10) Patent No.: US 11,090,812 B2
(45) Date of Patent: Aug. 17, 2021

(54) INSPECTION APPARATUS FOR OPTICALLY INSPECTING AN OBJECT, PRODUCTION FACILITY EQUIPPED WITH THE INSPECTION APPARATUS, AND METHOD FOR OPTICALLY INSPECTING THE OBJECT USING THE INSPECTION APPARATUS

(71) Applicant: Robert Bosch GmbH, Stuttgart (DE)

(72) Inventors: Alexander Thobe, Stuttgart (DE); Andreas Natterer, Stuttgart (DE); Jens Ackermann, Weil der Stadt (DE); Thomas Geiler, Adlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/495,464

(22) PCT Filed: Feb. 28, 2018

(86) PCT No.: PCT/EP2018/054863
§ 371 (c)(1),
(2) Date: Sep. 19, 2019

(87) PCT Pub. No.: WO2018/197078
PCT Pub. Date: Nov. 1, 2018

(65) Prior Publication Data
US 2020/0070350 A1 Mar. 5, 2020

(30) Foreign Application Priority Data
Apr. 27, 2017 (DE) .......................... 102017207069.2

(51) Int. Cl.
*B25J 9/16* (2006.01)
*G06T 7/70* (2017.01)
(Continued)

(52) U.S. Cl.
CPC ............ *B25J 9/1697* (2013.01); *G01N 21/13* (2013.01); *G01N 21/8851* (2013.01);
(Continued)

(58) Field of Classification Search
None
See application file for complete search history.

(56) References Cited

U.S. PATENT DOCUMENTS 9,565,400 B1 * 2/2017 Curlander ............ G08B 25/08
10,190,873 B1 * 1/2019 Yamagami ............ G01B 11/02
(Continued)

FOREIGN PATENT DOCUMENTS

DE        4426968 A1    2/1996
DE    102012014451 A1    3/2013
(Continued)

OTHER PUBLICATIONS

International Search Report for PCT/EP2018/054863, dated May 29, 2018.

*Primary Examiner* — Fernando Alcon
(74) *Attorney, Agent, or Firm* — Norton Rose Fulbright US LLP; Gerard Messina

(57) ABSTRACT

An inspection apparatus for optically inspecting an object, including a camera device is provided. The camera device has a focal plane that includes a focusing region and is designed for taking an image of the focusing region. The inspection apparatus further includes a handling device for gripping and/or picking up the object, and a control device for controlling the handling device. The control device is designed for controlling the handling device to position the object in the focusing region. The control device includes a model of the object; the control device being designed for controlling the handling device to position the object O in the focusing region on the basis of the model.

14 Claims, 1 Drawing Sheet

(51) Int. Cl.
  *G01N 21/13* (2006.01)
  *G01N 21/88* (2006.01)
  *G06T 7/00* (2017.01)
  *H04N 5/235* (2006.01)

(52) U.S. Cl.
  CPC ............... *G06T 7/001* (2013.01); *G06T 7/70* (2017.01); *H04N 5/2354* (2013.01); *G01N 2021/8887* (2013.01)

(56) References Cited

U.S. PATENT DOCUMENTS

| | | | | |
|---|---|---|---|---|
| 2004/0135827 A1* | 7/2004 | Kuramata | ................. | H01J 9/42 345/30 |
| 2007/0117225 A1* | 5/2007 | Capaldo | ................. | G01N 21/95 438/14 |
| 2010/0111364 A1* | 5/2010 | Iida | ................... | G06K 9/00214 382/103 |
| 2011/0122228 A1* | 5/2011 | Fujieda | ................. | G01B 11/03 348/46 |
| 2013/0211593 A1* | 8/2013 | Domae | ................. | B25J 9/1612 700/258 |
| 2014/0184852 A1* | 7/2014 | Niemi | ................. | H04N 5/2356 348/239 |
| 2015/0317784 A1* | 11/2015 | Oshima | ............. | G02B 27/0075 348/54 |
| 2016/0320344 A1* | 11/2016 | Spencer | ................. | G01N 29/28 |
| 2016/0379357 A1* | 12/2016 | Takazawa | ............. | G06T 7/0004 348/86 |
| 2017/0106540 A1* | 4/2017 | Watanabe | ............... | G06T 19/20 |
| 2017/0358048 A1* | 12/2017 | Kotake | ..................... | G06T 7/75 |
| 2018/0250822 A1* | 9/2018 | Shimodaira | ............ | B25J 9/1669 |
| 2018/0250823 A1* | 9/2018 | Shimodaira | ............ | B25J 9/0096 |
| 2018/0275073 A1* | 9/2018 | Yoshida | ................. | B25J 9/1697 |
| 2018/0370027 A1* | 12/2018 | Oota | ...................... | B25J 9/1612 |
| 2019/0070732 A1* | 3/2019 | Chen | ....................... | B25J 11/00 |
| 2019/0073760 A1* | 3/2019 | Wang | ............... | G05B 19/41875 |
| 2019/0091869 A1* | 3/2019 | Yamazaki | ................ | B25J 15/08 |
| 2019/0283241 A1* | 9/2019 | Eto | ...................... | B65G 47/917 |
| 2020/0051278 A1* | 2/2020 | Yamazaki | .......... | G06K 9/00201 |

FOREIGN PATENT DOCUMENTS

| | | |
|---|---|---|
| EP | 2639766 A1 | 9/2013 |
| EP | 2684651 A2 | 1/2014 |
| EP | 3156761 A1 | 4/2017 |
| JP | 2010125582 A | 6/2010 |
| JP | 2015136778 A | 7/2015 |
| JP | 2017015483 A | 1/2017 |
| WO | 03039820 A1 | 5/2003 |

* cited by examiner

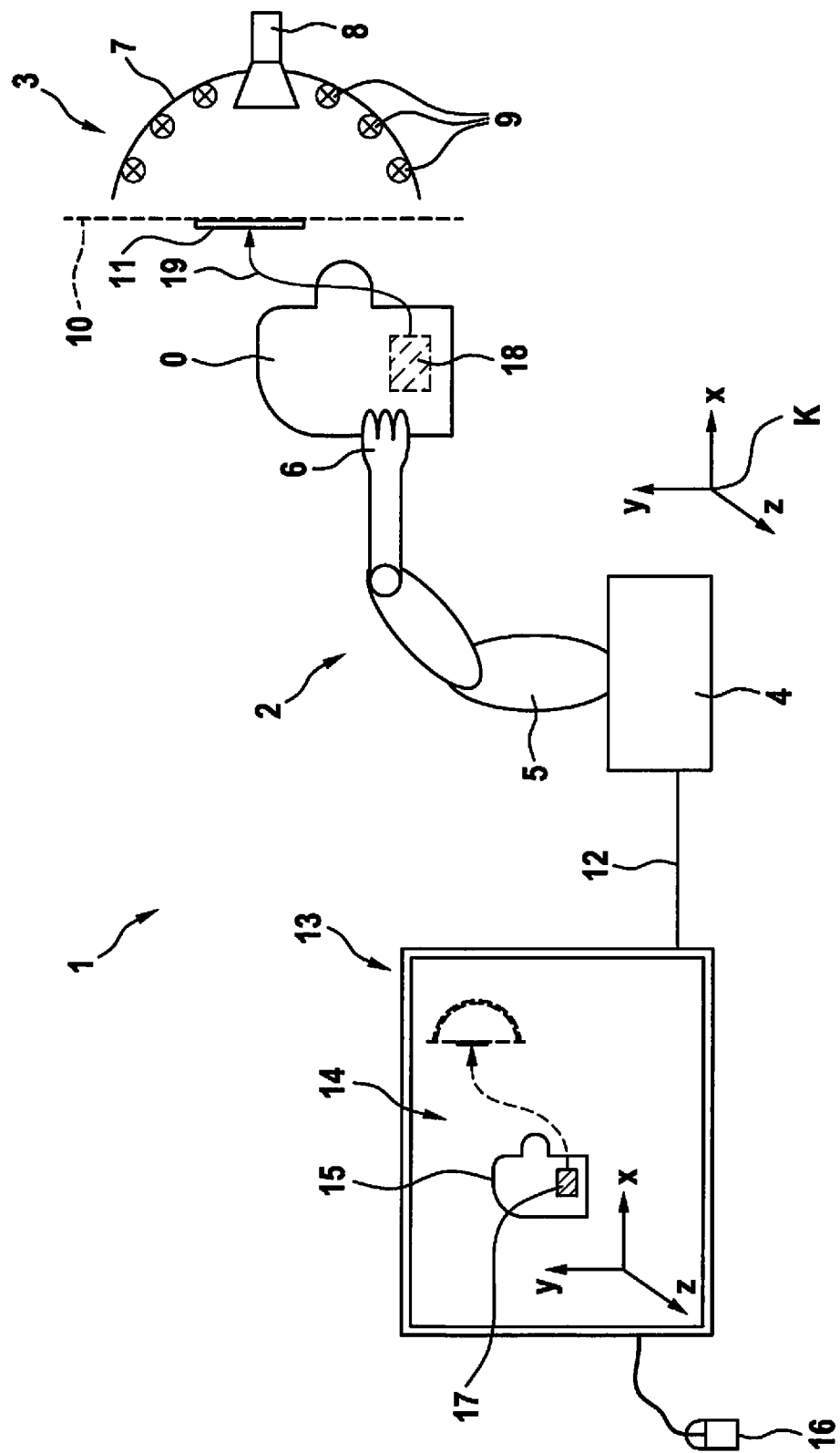

INSPECTION APPARATUS FOR OPTICALLY INSPECTING AN OBJECT, PRODUCTION FACILITY EQUIPPED WITH THE INSPECTION APPARATUS, AND METHOD FOR OPTICALLY INSPECTING THE OBJECT USING THE INSPECTION APPARATUS

FIELD

The present invention relates to an inspection apparatus for optically inspecting an object, including a camera device, the camera device having a focal plane with a focusing region and being designed for taking an image of the focusing region.

BACKGROUND INFORMATION

In manufacturing, special machines are typically used to automate visual inspection tasks. When a facility is developed, the product spectrum to be inspected, including all inspection positions, should be known. To this end, fixed camera positions are defined specifically for a product for all inspection tasks. During initial start-up, the image distance and/or the focal length are manually adjusted so that the image quality meets the requirements of the inspection task and is subsequently mechanically fixed. Often, a later improvement is possible. However, this is very expensive and entails significant costs.

German Patent No. DE 44 26 968 C2, which constitutes related art, describes an optical examining device having at least one light source, one light guide and a light-receiving inspection system; the at least one light source injecting light into the light guide. The optical examining device has an opening, which is bounded on an inner side by four walls, and within which an object to be examined is accommodated. At the outer rim thereof, it has reflectors and further reflectors variably inclined thereto; the reflectors deflecting a portion of the injected light so as to illuminate the side surface of the object; the further reflectors deflecting a further portion of the injected light so as to illuminate the top side of the object; and the wall deflecting the light reflected off of the side surfaces of the object toward the inspection system that faces the top side of the object.

SUMMARY

In accordance with the present invention, an inspection apparatus is provided for optically inspecting an object. Also provided are a production facility and a method for optically inspecting the object using the inspection apparatus. Preferred and/or advantageous specific embodiments of the present invention are described herein and are shown in the figures.

The present invention provides an inspection apparatus for optically inspecting an object. The inspection apparatus is stationary or mobile. In particular, the inspection apparatus is designed to be integrated in a production facility or in a manual workplace, or is designed as a stand-alone system. It is especially preferred that the inspection apparatus be a pick-and-place inspection apparatus.

The optical inspection corresponds, in particular to a visual inspection of the object, for example, in the visible wavelength region, in the infrared wavelength region or in the ultraviolet wavelength region of light. The object is a component, a workpiece and/or a product of a production facility, for example. It has a shining, reflecting, dull or absorbing surface throughout or in some sections. It may differ in size, for example, be smaller than 10 centimeters or larger than 100 centimeters. The inspection apparatus is designed, in particular for optically inspecting a diverse portfolio of objects, in particular different objects.

The inspection apparatus has a camera device. The camera device preferably includes a camera or a plurality of cameras, such as, for example, at least two cameras and, in the specific case, at least 10 cameras. In particular, the camera device has a transmitted light camera. The camera device and/or the cameras feature an acquisition direction. The camera device has at least one focal plane; when the camera device includes a multiplicity of cameras, it may have a plurality of focal planes. The focal plane may also be in the form of a focusing range. The focal plane includes a focusing region; if there are a plurality of focal planes, the camera device may have a plurality of focusing regions. The acquisition direction is, in particular, orthogonal to the plane of focus. In particular, the plane of focus is the region that the camera device brings into sharp focus completely in the image.

The camera device is designed for taking at least one image of the focusing region. In particular, the camera is a video camera; alternatively, the camera is a single-image camera. In particular, the camera is a CCD camera, for example, a color camera or a monochrome camera. Alternatively, the camera is a CMOS camera. The camera may also be an infrared or an ultraviolet camera.

The inspection apparatus includes a handling device for gripping and/or picking up the object. In particular, the handling device is designed for moving the object, for example, for moving the object along a path and/or a trajectory. The handling device is thereby a robot, for example, in particular a robot arm. The handling device is preferably a three-axis, a six-axis or a multiaxis robot. The handling device has a gripper, for example, the gripper being designed for gripping and holding the object. The handling device may thereby hold the object pneumatically, mechanically or by an electromagnetic force, for example. The handling device thereby holds and/or picks up the object, in particular nonpositively, positively or by frictional engagement.

The inspection apparatus has a control device for controlling the handling device. The control device is designed, for example, as a computer unit, a processor unit, or as a microchip. For example, the control device uses control signals to control the handling device; the control device communicating with the handling device by a data and/or signal link. It is especially preferred that the control device be part of the handling device and/or encompassed by the same.

The control device is designed to control the handling device to position the object in the focusing region. The control device thereby uses control signals to control the handling device, for example; on the basis of the control signals, the handling device moving the object into the focusing region and/or positioning the object therein. Positioning the object in the focusing region equates, in particular to positioning the surface of the object in the focusing region.

The control device includes a model of the object. In particular, the model of the object may be stored in the control device using a data link, for example. The model of the object is preferably a 3D model; in the specific case, the model of the object is a CAD model.

The control device is designed to control the handling device to position the object in the focusing region on the basis of the model of the object. On the basis of the model, the control device may thereby control the handling device to move the object to the focusing region according to a trajectory. In particular, the control device uses the model to compute and/or determine the trajectory and/or the path along which the handling device needs to move the object into the focusing region.

It is an object of the present invention to provide an inspection apparatus that will be versatilely adaptable to different objects, there being no need to adapt the optical system and/or the handling device to change the objects to be inspected. In particular, the present invention makes possible a versatile inspection apparatus for inspecting an object, without having to change hardware in response to a change in the object portfolio of the inspection. In the specific case, the inspection apparatus is an advantageous approach for overcoming disadvantages of the related art.

In an especially preferred embodiment of the present invention, the control device is designed to control the handling device on the basis of the model to position the object in the focal plane. In particular, on the basis of the control signals, the handling device positions the object in the focal plane of the camera device. In particular, positioning the object in the focal plane equates to positioning the surface of the object in the focal plane. In the specific case, the focusing region is understood to be a region that resides completely within the focal plane.

A possible embodiment of the present invention provides that a section of the model, in particular any section of the model, be selectable as a selection region. In this regard, the inspection apparatus includes, for example, an input device and/or input means; via the input device, a user being able to select the section of the model as a selection region. In the specific case, a plurality of sections of the model are selectable as selection regions. The section of the model may preferably be graphically selected in the model, for example, on a display device that is included in the input device.

The control device is designed to define a section of the object that corresponds to the selection region as an object selection region. The object selection region corresponds, in particular to that region on the object which is selected accordingly on the model as the selection region. The control device is designed to control the handling device to position the object with object selection region in the focusing region and/or the focal plane. In particular, the control device is designed to control the handling device to move and/or position the object with the object selection region in the focusing region and/or the focal plane. When a plurality of selection regions are selected, the control device is designed, for example, to successively position corresponding object selection regions in the focusing region and/or the focal plane of the camera device. This embodiment is based on the idea of providing an inspection apparatus that permits a point-by-point and specific inspection of the object therewith.

A possible embodiment of the present invention provides that the control device include device data. In particular, the device data include information on the geometry, the design, distances and/or possible movements and/or trajectories of the handling device. For example, the device data include all possible paths that the handling device may travel and/or upon which the handling device may move the object.

The control device is designed to control the handling device on the basis of the device data in order to position the object in a collision-free manner in the focusing region and/or in the focal plane. A collision-free manner means, in particular without collision among the object, camera device and/or handling unit. In particular, the control device is designed to use the device data to determine a path and/or a trajectory upon which the object may be positioned in a collision-free and/or crash-free manner in the focusing region and/or in the focal plane and/or moved into the focusing region and/or the focal plane. This embodiment is based on the idea of providing an inspection apparatus that permits a secure handling of the object during the inspection.

It is especially preferred that the inspection apparatus include an illumination device. The illumination device has, in particular a plurality of light sources. In particular, the illumination device has more than ten, in particular more than fifteen and, in the specific case, more the one hundred light sources. The light sources are LEDs, for example. In particular, the light sources are white light sources, infrared sources, colored light sources and, in the specific case, RGB light sources. In particular, the light sources are point light sources; alternatively and/or additionally, the light sources are planar light sources, such as OLED surfaces, for example.

The control device is designed to control the illumination unit so as to enable the camera device to be able take a high-contrast image of the focusing region and/or of the focal plane, in particular a high-contrast image of the object positioned in the focusing region and/or in the focal plane. The control device is thereby designed, for example, to control the light sources of the illumination unit individually and/or by groups, for example, to switch an LED and/or a group of LEDs on or off, to achieve the desired illumination of the focusing region and/or of the focal plane. This embodiment is based on providing an inspection apparatus that takes high-quality and analyzable images of the object. In particular, this embodiment renders possible a continuous quality of images.

A possible embodiment provides that the control device include at least one selectable inspection program. The inspection program includes information, for example, which type of image, for example, infrared, visual or monochrome, is to be taken. In particular, the inspection program includes the selection region of the object that is to be examined. In the specific case, the inspection program also includes information for illumination by the illumination unit.

In particular, on the basis of the selected inspection program, the control device is designed to control the handling device to position the object in the focusing region and/or in the focal plane. In particular, on the basis of the inspection program, the control device is designed to take an image of the object selection region of the object that corresponds to the selection region stored in the inspection program. In the specific case, the input device may be used to select, adapt and/or adjust the inspection program. This embodiment is based on providing an inspection apparatus that a user may readily adjust to the inspection to be performed.

It is especially preferred that the control device be designed to control the illumination unit to take an image of the object positioned in the focusing region and/or in the focal plane in accordance with the inspection program. In particular, the control device is designed to illuminate the object by controlling the illumination unit in a way that makes it possible for an image to be taken in accordance with the inspection program.

An embodiment provides that the inspection apparatus feature a rest detector. The rest detector is preferably configured on the gripper and/or on the handling device. The rest detector is, in particular a vibration detector and/or an acceleration sensor. The rest detector is designed to detect when the handling device and/or the gripper are/is at rest and/or when the handling device and/or the gripper are/is vibration-free. The camera device is designed to first take an image when the rest detector detects that the handling device is at rest and/or vibration-free. This embodiment is based on providing an inspection apparatus that prevents images of the object to be taken that are difficult to analyze and/or are blurry.

In an especially preferred embodiment of the present invention, the camera device is a camera device having a fixed focal length and/or a fixed image distance. In particular, the camera device includes cameras having a fixed focal length and/or a fixed image distance. Thus, the focal length and/or the image distance of the camera device is especially not adjustable. In particular, the camera device is a camera device that is not focusable. This embodiment is based on providing a particularly favorable inspection apparatus without having to use expensive focusing lenses for the camera devices.

An especially preferred embodiment of the present invention provides that the inspection apparatus include a starting-position determination module. As an optimization parameter for determining the starting position, the sharpness of the image is used, in particular. For example, it is also possible that the starting-position determination module is part of the control device. The starting-position determination module is designed for determining a starting position of the object that is gripped and/or held by the handling device. In the special case, the starting-position determination module is designed for determining the starting position for a fixed focal length and image distance. In particular, the starting position includes the position and/or location of the object gripped by the holding device, in particular at a starting instant. This embodiment is based on the idea of providing an inspection apparatus that will make possible a referencing of a starting position of the object, in particular in order that the path and/or the trajectory for positioning the object in the focusing region be able to be correctly determined and/or executed.

It may thereby be provided that the control device be designed to control the handling device in order to move the object from the starting position into the focusing region and/or to position it therein. In particular, the control device is designed to control the handling device to move the object in a crash-free and/or collision-free manner from the starting position into the focusing region. The control device is preferably designed to optimize the path with regard to short cycle times.

It is especially preferred that the starting-position determination module be designed to control the camera device to record at least one estimated image, in particular at least two estimated images and, in the specific case, at least three estimated images. Preferably, fewer than 10 estimated images and, in the specific case, fewer than five estimated images are recorded. It is especially preferred that three estimated images be recorded. The estimated image is preferably a live image of the object that is recorded by the camera device. In particular, the estimated images are images of image sections of the object, these image sections being closely spaced apart. The different image sections of the object may preferably be recorded as an estimated image without moving the handling device from the camera device and/or by only slightly moving it therefrom. For example, the image sections overlap, at least in pairs.

The starting-position determination module is designed for comparing the module to the at least one estimated image, for example, to the CAD model. In particular, the starting-position determination module is designed for comparing the module to a plurality of estimated images of the object. Moreover, the starting-position determination module is designed for determining the starting position of the object, in particular the location, the position, and/or the configuration of the object in the starting position, by comparing the model to the at least one estimated image. The determination of the starting position by the starting-position determination module is to be understood, in particular as an initialization of the inspection apparatus. This embodiment is based on the idea of providing an inspection apparatus that readily determines the starting point of a position of the object to be measured. Moreover, it is a consideration of the present invention to determine the starting position without completely scanning the object; in particular, it being possible to reduce the time for determining the starting position since there is no need to wait for recovery times of the mechanical system during travel of the object.

A production facility equipped with the inspection apparatus constitutes a further object of the present invention. The production facility is, in particular a workplace, a robot workplace, a machine workplace or a manual workplace for a person to manufacture the object. The inspection apparatus is preferably designed for automatically and/or independently gripping an object produced by the production facility and/or for picking up the same. In particular, the inspection apparatus is designed for optically inspecting at least 90% of the manufactured parts. In the specific case, the inspection apparatus is designed for optically inspecting all, thus, in particular 100% of the manufactured objects of the production facility. This embodiment is based on the idea of providing a production facility, in particular a production facility having a changing product portfolio, with an inspection apparatus that will make possible an especially simple and favorable optical inspection of the manufactured objects.

A method for optically inspecting the object using the inspection apparatus constitutes a further object of the present invention. In particular, the method is characterized by the control device controlling the handling device. In particular, the control device controls the handling device to position the object in the focusing region of the camera device on the basis of the model. In particular, the handling device positions the object in the focusing region and/or in the focal plane. This embodiment of the present invention is based on the idea of providing a simple and cost-effective method for optically inspecting an object.

Another especially preferred embodiment of the method provides that the handling device pick up the object. For example, the handling device picks up the object directly from the production facility. The handling device is thereby a pick-and-place inspection apparatus, for example. In this embodiment, the camera device takes at least one estimated image of the object, the starting-position determination module comparing this estimated image to the model of the object and, on the basis of this comparison, determining the starting position of the object.

Other features, advantages and effects of the present invention are described in connection with preferred exemplary embodiments.

BRIEF DESCRIPTION OF THE DRAWING

FIG. 1 shows an exemplary embodiment of the inspection apparatus.

DETAILED DESCRIPTION OF EXAMPLE EMBODIMENTS

FIG. 1 illustrates an exemplary embodiment of inspection apparatus 1. Inspection apparatus 1 includes a handling device 2 and a camera device 3. Handling device 2 is designed for handling and gripping an object O.

Handling device 2 includes a base 4 and a multiaxis robot 5 supported and/or configured thereon. In particular, base 4 is provided for the vibration-free and/or stable supporting of multiaxis robot 5. At the unattached end thereof, multiaxis robot 5 includes a gripper 6. Gripper 6 is designed for gripping and holding, in particular for holding object O nonpositively, positively, and/or by frictional engagement. Gripper 6 is movable within an operating range of handling device 2; gripper 6 being movable on a definable path within the operating range.

In particular, object O is a component. The component is preferably an electronic component, a vendor supplied automotive component or a production product. Object O is preferably smaller than 10 centimeters and, in the specific case, smaller than five centimeters. Alternatively, object O may be a larger sized object, for example, a fender; such an object preferably having a length greater than meter and, in the specific case, greater than one millimeter. Object O may be a planar object; alternatively object O is a bulky object.

An object O gripped by the gripper is movable, in particular within the operating range of handling device 2; object O defining the same path as gripper 6 of handling device 2.

As an aid, a coordinate system K is shown to provide orientation, coordinate system K defining an X direction, a Y direction and a Z direction. The path that is traversed by gripper 6 and/or object O within the operating range of handling device 2 is definable, in particular by the X direction, Y direction and Z direction.

Inspection apparatus 1 includes camera device 3, which features a housing 7, a camera 8, and an illumination unit 9. Camera 8 is a CCD camera, for example; alternatively, camera 8 is a CMOS camera.

Housing 7 is formed as a domed hollow member; in this exemplary embodiment, as a hemispherical hollow member. Hemispherical hollow member is sliced in the equatorial plane, in particular. Housing 7 has an opening, a focal plane 10 of camera 8 and/or of camera device 3 being configured in the opening. Housing 7 has an inner region, the inner region preferably being reflecting; alternatively, the inner region being absorbing.

Illumination unit 9 is configured in the inner region of housing 7; illumination unit 9 including a plurality of lighting sources, in particular LEDs. The LEDs are placed equidistantly and/or uniformly on the inner side of housing 7. Opposite focal plane 10 is a further opening; this opening being configured on the pole of hemispherical housing 7. Camera 8 having a direction of view toward focal plane 10 is placed in this opening at the pole.

Focal plane 10 has a focusing region 11. Focusing region 11 is, in particular that region which is imaged by camera 8 completely, in particular at high contrast. Focusing region 11 is, in particular a region having a surface area greater than one square centimeter and, specifically, greater than 10 square centimeters. Focusing region 11 is a planar region, in particular a flat region. Alternatively, focusing region 11 is a curved region; in this case, focal plane 10 also being a curved plane.

Handling device 2 is linked via a data connection 12 to control device 13. Data connection 12 may be a cable connection. Alternatively, connection 12 is a virtual connection, for example, a wireless connection in an infrared form.

Control device 13 is designed as a computer unit, for example. Control unit 13 preferably includes a display unit 14. In particular, display unit 14 is a touchscreen monitor. Control device 13 includes a model 15 of object O. Model 15 is, in particular a 3D model, for example, a CAD model. In the specific case, model 15 is a true-to-scale model. Preferably, model 15 includes the position of, location of, and/or geometric information on camera device 3. It is especially preferred that model 15 include the position of focal plane 10 and, in particular of focusing region 11. Control device 13 has input means 16; input means 16 being a computer mouse, for example. Alternatively, input means 16 may also be in the form of the touchscreen monitor. Via input means 16, a user may also select a selection region 17 in model 15 of object O. In particular, selection region 17 is freely selectable in model 15. In particular, selection region 17 is a planar region that may be linearly and/or curvilinearly bounded. In the real world, on object O, an object selection region 18 corresponds to selection region 17 of model 3. Object selection region 18 is thereby the region on the real object that was selected on model 15 as selection region 17. Control device 13 is designed to determine a trajectory 19 along which object O having object selection region 18 needs to be moved to place object selection region 18 in focusing region 11 and/or in the focal plane of camera device 3. This trajectory 19 may be parameterized and/or computed, in particular using coordinate system K.

Control device 13 thereby controls handling device 2 to move object O to place object selection region 18 along trajectory 19, so that, once moved, object selection region 18 is located within focusing region 11. By moving object O having object selection region 18 into focusing region 11 and/or into the focal plane, a very cost-effective inspection apparatus 1 may be achieved since cameras 8 having a constant focal length and not having any expensive focusing devices may be used here.

What is claimed is:

1. An inspection apparatus for optically inspecting an object, comprising:
   a camera device having a focal plane that includes a focusing region, the camera device being configured for taking an image of the focusing region, the camera device having a fixed focal length and/or a fixed image distance;
   a handling device configured to grip and/or pick up the object; and
   a control device configured to control the handling device to position the object in the focusing region, the control device including at least one selectable inspection program that is selectable by user input using an input device, the control device including a model of the object, the control device being configured to control the handling device to position the object in the focusing region based on the basis of the model, wherein a section of the model of the object is selectable as a selection region by user input to a graphic display of the model using the input device, the control device being configured to determine a section of the object that corresponds to the selection region as an object selection region, and to control the handling device to position the object with the object selection region in the focusing region and/or in the focal plane, the control device being configured to control the handling device to position the object in the focusing region and/or in the focal plane based on the selected inspection program.

2. The inspection apparatus as recited in claim 1, wherein the control device is configured to control the handling device to position the object in the focal plane based on the model.

3. The inspection apparatus as recited in claim 1, wherein the control device is configured to control the handling device to position the object in a collision-free manner in the focusing region and/or in the focal plane based on device data.

4. The inspection apparatus as recited in claim 1, further comprising:
an illumination device, the control device being configured to control the illumination unit so as to enable the camera device to take a high-contrast image of the object positioned in the focusing region and/or in the focal plane in accordance with an inspection program.

5. The inspection apparatus as recited in claim 1, wherein the control device includes at least one selectable inspection program, the control device being configured to control the handling device to position the object in the focusing region and/or in the focal plane based on a selected inspection program.

6. The inspection apparatus as recited in claim 4, wherein the control device is configured to control the illumination unit in order to take an image of the object positioned in the focusing region and/or in the focal plane in accordance with the inspection program.

7. The inspection apparatus as recited in claim 4, further comprising:
a rest detector configured to detect when the handling device is at rest and/or is vibration-free, the camera device being configured to first take the image when the handling device is at rest and/or is vibration-free.

8. The inspection apparatus as recited in claim 1, wherein the control device is configured to determine a starting position of the object that is gripped and/or held by the handling device.

9. The inspection apparatus as recited in claim 8, wherein the control device is configured to control the handling device to move the object from the starting position into the focusing region and/or into the focal plane and/or into a position in the focusing region and/or into a position in the focal plane.

10. The inspection apparatus as recited in claim 8, wherein the control device is configured to control the camera device to record at least one estimated image, and to compare the model to the at least one estimated image, and, on the basis of the comparison, to determine the starting position of the object.

11. A production facility for manufacturing objects, the production facility being equipped with an inspection apparatus configured to optically inspect at least 90% of the manufactured objects, the inspection apparatus comprising:
a camera device having a focal plane that includes a focusing region, the camera device being configured for taking an image of the focusing region, the camera device having a fixed focal length and/or a fixed image distance;
a handling device configured to grip and/or pick up the object; and
a control device configured to control the handling device to position the object in the focusing region, the control device including at least one selectable inspection program that is selectable by user input using an input device, the control device including a model of the object, the control device being configured to control the handling device to position the object in the focusing region based on the basis of the model, wherein a section of the model of the object is selectable as a selection region by user input to a graphic display of the model using the input device, the control device being configured to determine a section of the object that corresponds to the selection region as an object selection region, and to control the handling device to position the object with the object selection region in the focusing region and/or in the focal plane, the control device being configured to control the handling device to position the object in the focusing region and/or in the focal plane based on the selected inspection program.

12. A method for optically inspecting an object using an inspection apparatus, the method comprising:
providing the inspection apparatus, the inspection apparatus including a camera device having a focal plane that includes a focusing region, the camera device being configured for taking an image of the focusing region, the camera device having a fixed focal length and/or a fixed image distance, the inspection apparatus further including a handling device configured to grip and/or pick up the object, and the inspection apparatus further including a control device configured to control the handling device to position the object in the focusing region, the control device including a model of the object, the control device being configured to control the handling device to position the object in the focusing region based on the basis of the model;
controlling, by the control device, the handling device to position the object, based on the model, in the focusing region and/or in the focal plane of the camera device, the control device including at least one selectable inspection program that is selectable by user input using an input device, wherein a section of the model of the object is selectable as a selection region by user input to a graphic display of the model using the input device, the control device being configured to determine a section of the object that corresponds to the selection region as an object selection region, and to control the handling device to position the object with the object selection region in the focusing region and/or in the focal plane, the control device being configured to control the handling device to position the object in the focusing region and/or in the focal plane based on the selected inspection program.

13. The optical inspection method as recited in claim 12, wherein the handling device picks up and/or grips the object; the camera device takes at least one estimated image of the object; and the control device compares the estimated image to the model, and on the basis of the comparison, determines a starting position.

14. The inspection apparatus as recited in claim 1, wherein the model includes a position of the focusing region.

* * * * *